(12) United States Patent
Kwon et al.

(10) Patent No.: US 8,948,600 B2
(45) Date of Patent: Feb. 3, 2015

(54) TRANSMITTER FOR WIRELESS OPTICAL COMMUNICATION SYSTEM USING LIGHT SOURCE

(75) Inventors: Jae Kyun Kwon, Daegu (KR); Sung-Yoon Jung, Daegu (KR); Ja-Soon Jang, Daegu (KR); Kang-Il Ahn, Daegu (KR)

(73) Assignee: Industry-Academic Cooperation Foundation, Yeungnam University (KR)

( * ) Notice: Subject to any disclaimer, the term of this patent is extended or adjusted under 35 U.S.C. 154(b) by 187 days.

(21) Appl. No.: 13/699,817

(22) PCT Filed: May 24, 2011

(86) PCT No.: PCT/KR2011/003807
§ 371 (c)(1),
(2), (4) Date: Nov. 26, 2012

(87) PCT Pub. No.: WO2011/149254
PCT Pub. Date: Dec. 1, 2011

(65) Prior Publication Data
US 2013/0071107 A1    Mar. 21, 2013

(30) Foreign Application Priority Data

May 25, 2010   (KR) .................. 10-2010-0048685
May 23, 2011   (KR) .................. 10-2011-0048723

(51) Int. Cl.
*H04B 10/116*   (2013.01)
*H04B 10/516*   (2013.01)
*H04B 10/07*    (2013.01)

(52) U.S. Cl.
CPC .............. *H04B 10/516* (2013.01); *H04B 10/07* (2013.01); *H04B 10/116* (2013.01)

USPC ...................... 398/120; 398/119; 398/127

(58) Field of Classification Search
CPC ...................................... H04B 10/116
USPC ............................. 398/119, 120, 127
See application file for complete search history.

(56) References Cited

U.S. PATENT DOCUMENTS 5,689,441 A * 11/1997 Ranganath et al. ............. 398/52
7,689,130 B2 * 3/2010 Ashdown ...................... 398/172
2012/0045218 A1 * 2/2012 Sugawara et al. ............. 398/182

FOREIGN PATENT DOCUMENTS

| JP | 2006325085 | 11/2006 |
| JP | 2008206086 | 9/2008 |
| JP | 2009290359 | 12/2009 |
| KR | 1020100121448 | 11/2010 |

OTHER PUBLICATIONS

International Search Report—PCT/KR2011/003807 dated Dec. 26, 2011.

* cited by examiner

*Primary Examiner* — Nathan Curs
(74) *Attorney, Agent, or Firm* — Cantor Colburn LLP (57) ABSTRACT

A transmission apparatus of a wireless light communication system using an illumination light source can maximize a rate of data transmission while maintaining a brightness adjusting function of the illumination light source. The transmission apparatus includes a dimming level input unit which receives a dimming level of the illumination light source as an input, a coder which codes original data and outputs the coded data, a dimming coder which checks the dimming level input to the dimming level input unit, generates a symbol-codeword table corresponding to the dimming level, and dimming-codes the data output from the coder, a line coder which converts the data diming-coded by the dimming coder into pulse signals.

14 Claims, 11 Drawing Sheets

TRANSMITTER FOR WIRELESS OPTICAL COMMUNICATION SYSTEM USING LIGHT SOURCE

TECHNICAL FIELD

The present invention relates to a transmission apparatus of a wireless light communication system using an illumination light source, and more particularly, to a transmission apparatus of a wireless light communication system using an illumination light source capable of maximizing a rate of data transmission while maintaining a brightness adjusting function of the illumination light source.

BACKGROUND ART

Wireless visible light communication is a next-generation communication technology where communication is performed by using visible light having a wavelength range from 380 nm to 780 nm. This technology can be used as a system for transmitting data by using light of indoor or outdoor illumination, advertizing lighting panels, signal lamps, streetlamps, or the like. This system can be used in hospitals, airplanes, or the like where use of radio wave is limited. In addition, in the light communication technology, communication can be performed through modulation of a visible light emitting apparatus such as an illumination apparatus, and thus, much attention is paid to the technology as a next-generation high-speed transmission technology. In particular, in the light communication using visible LEDs (light emitting diodes), high speed modulation can be performed, and security-enhanced ubiquitous communication networks can be implemented without a high-cost infrastructure or without harm to human bodies. Currently, standardization of the afore-mentioned light communication technology is in progress in 802.15.7 Task Group of IEEE (Institute of Electrical and Electronics Engineers).

On the other hand, since the LED is a semi-permanent device, once it is installed, there is almost no necessity for replacement or maintenance. In addition, since the LED has very small power consumption, electric energy can be saved. In addition, since the LED can be implemented as a small-sized, light-weighted device, its installation site is not greatly limited. Therefore, the LED can be used in various applications such as indoor/outdoor illumination and car lamps.

Therefore, the market of LED illumination using the LEDs has been rapidly expanded, and the light communication technology using the LEDs is a good prospect for ubiquitous communication infrastructure such as an intelligent traffic system. The theoretical background for transmission of data on LED illumination is that illumination light beam is allowed to blink at a high speed. When the data is carried on the blinking light beam of the LED illumination to be transmitted, since human eyes are insensitive to the blinking of 100 times or more per second, the human being recognizes the LED illumination as simple illumination, and thus, illumination and communication can be simultaneously implemented through the blinking. In the beginning of the technology using the LED illumination as a communication method, an OOK (On-Off Keying) method is mainly used where data are transmitted simply through ON and OFF of the LED illumination. Among other communication methods using the LED illumination, an NRZ-OOK (Non-Return-to-Zero On-Off Keying) method is most useful for increasing the communication rate except for the difficulty in synchronization. In the binary transmission of the NRZ-OOK method, '1' is transmitted through ON pulses, and '0' is transmitted through OFF pulses.

In addition, M-ary Pulse Amplitude Modulation (hereinafter, referred to as an 'M-PAM') method where a signal is modulated into M levels to be transmitted can be used for high speed data transmission. The above-described NRZ-OOK method is an M-PAM method with M=2. As M is increased, the high speed data transmission can be implemented. However, in this case, a decrease in communication performance due to noise needs to be considered.

On the other hand, in the case where data are modulated through an NRZ-OOK (Non-Return-to-Zero On-Off Keying) method or an M-PAM method to be transmitted, since some kinds of data are transmitted in a mixture of the ON/OFF pulses or multi-level pulses, the brightness of illumination is always smaller than the brightness in the case where the maximum value is ON. In general, for communication, source-coded data need to have '1' and '0' in the same numbers. Therefore, in the case where the source-coded data are carried on the LED illumination to be transmitted, there is a problem in that the bright of illumination is smaller by 50% than the brightness in the state where the value is always ON. In addition, at first, in the side where the LED illumination is installed, a decrease in brightness due to the visible light communication is expected not to be considered, and a brightness adjusting function of adjusting the maximum value of brightness of the illumination to be in a range from 0 to 100%, that is, a dimming level adjusting function is included as a unique function of the LED illumination. In the LED illumination, the brightness adjusting is implemented by reducing the amplitude of the illumination light, or it is implemented by adjusting an ON/OFF interval ratio like pulse width modulation (hereinafter, referred to as PWM). The PWM is more generally used. On the other hand, in the case where the NRZ-OOK (Non-Return-to-Zero On-Off Keying) method is used for the LED illumination and the communication, the ON/OFF interval ratio is adjusted to be about 50%. Therefore, in the case where light communication is to be performed by using the LED illumination, the dimming function of adjusting the maximum value of the brightness of illumination to be in a range from 0 to 100% and the communication function of adjusting the ON/OFF interval ratio to be 50% is conflicted. In the case where the M-PAM method is used instead of the OOK method, the same conflict occurs between the dimming function and the communication function.

In order to solve this conflict, S. Kaur, W. Liu, and D. Castor proposed "VLC Dimming Proposal" in IEEE 802.15-09-0641-00-0007 on September, 2009. In the "VLC Dimming Proposal", a time multiplexing method for communication and illumination is used where the ON interval and the OFF interval are forcibly added to adjust the entire dimming levels without a change of the communication interval having a duty ratio of 50%. In the time multiplexing method is used, when the dimming level $P_d$ is smaller than 50%, the OFF interval is added, and when the dimming level $P_d$ is larger than 50%, the ON interval is added. For example, if the communication interval is a half of the entire time and the remaining half time is set as the ON interval, the dimming level becomes 75%, and the data transmission rate is decreased by half.

In the case where the time multiplexing method in the related art is used, if the dimming level is denoted by $P_d$ and the efficiency of communication interval is denoted by $E_0$, and if $P_d > 50\%$, the relationship between the dimming level and the efficiency of communication interval is expressed by Equation 1.

$$E_o = 2 - 2P_d \quad \text{[Equation 1]}$$

When the efficiency of communication interval of the case where the entire time is used for the NRZ-OOK communication is defined to be 1, the efficiency is simply $E_0$. If $P_d$<50%, the efficiency $E_0$ is calculated as the following Equation 2.

$$E_o = 2P_d \quad \text{[Equation 2]}$$

Figure 1:
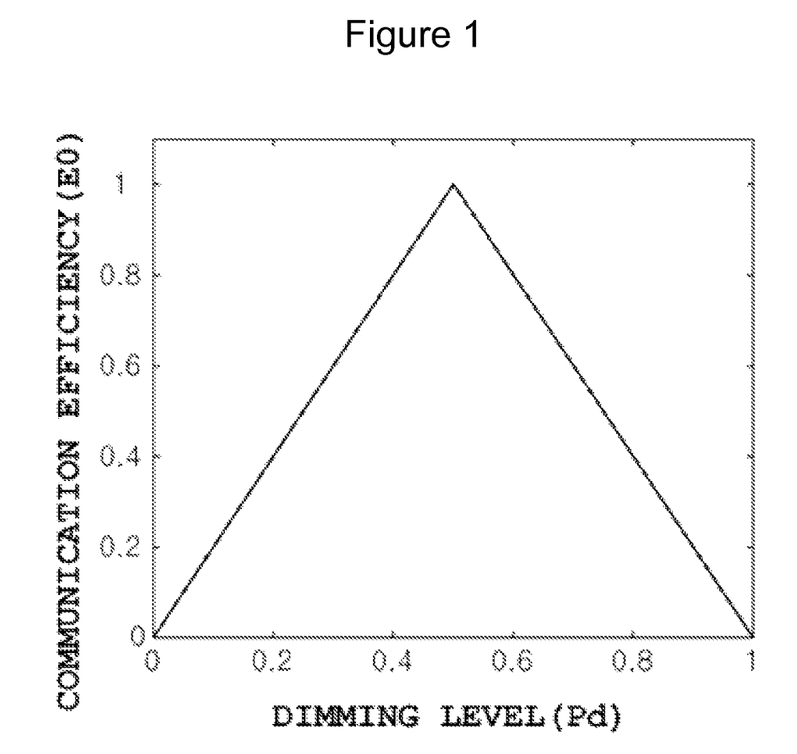
FIG. 1 is a graph illustrating a characteristic of a change in efficiency of communication interval according to a dimming level in the related art.

If the efficiency of communication interval is expressed by using Equations 1 and 2, a characteristic of a change in efficiency of communication interval illustrated in FIG. 1 is obtained. FIG. 1 is a graph illustrating a characteristic of a change in efficiency of communication interval according to a dimming level in the related art. Referring to FIG. 1, it can be seen that there is a problem in that the efficiency is rapidly decreased when the dimming level is deviated from 50%.

DISCLOSURE

Technical Problem

The present invention is to provide a transmission apparatus of a wireless light communication system using illumination light source capable of maximizing an efficiency of communication while maintaining a brightness adjusting function by using dimming coding.

Technical Solution

According to a first aspect of the present invention, there is provided a transmission apparatus of a wireless light communication system using an illumination light source including: a dimming level input unit which receives a dimming level of the illumination light source as an input; a coder which codes original data so that '1' and '0' occupy by 50%, respectively, and output the coded data; a dimming coder which checks the dimming level input to the dimming level input unit and dimming-codes the data output from the coder by using a symbol-codeword table corresponding to the dimming level; and a line coder which converts the data dimming-coded by the dimming coder into pulse signals for driving the illumination light source and outputs the pulse signals to the illumination light source, wherein the illumination light source emits light according to the pulse signal output from the line coder.

In the transmission apparatus according to the above aspect, the dimming coder may primarily dimming-code data so as to satisfy a predetermined amount of the dimming level and outputs the data, and the line coder may convert the data dimming-coded by the dimming coder into pulse signals, perform analog dimming on the converted pulse signals so as to satisfy the dimming level, and output the data to the illumination light source.

In the transmission apparatus according to the above aspect, the dimming coder may generate the symbol-codeword table corresponding to the dimming level input from the dimming level input unit and dimming-code data output from the coders by using the generated symbol-codeword table.

In the transmission apparatus according to the above aspect, the transmission apparatus may further include a data storage unit which stores the symbol-codeword tables corresponding to a plurality of the dimming levels, wherein the dimming coder reads the symbol-codeword table corresponding to the dimming level input from the dimming level input unit from the data storage unit and dimming-codes data output from the coders by using the read symbol-codeword table.

In the transmission apparatus according to the above aspect, the dimming coder may use a symbol-codeword table for performing a source-coding process in an inverse manner to code data.

In the transmission apparatus according to the above aspect, the coder may include a source coder which receives digital data as an input or receives analog data as an input and converts the analog data into digital data to compress and code the digital data.

In the transmission apparatus according to the above aspect, the coder may include one or more of: a channel coder which codes the data output from the source coder so that errors occurring during transmission of data through a channel can be detected or corrected; a channel interleaver which re-arranges a data sequence in order to prevent burst errors on the channel; and a scrambler which randomizes a data pattern when a ratio of '0' and '1' is deviated from 50% after channel coding of the channel coder.

In the transmission apparatus according to the above aspect, the transmission apparatus may further include a modulation level determination unit which determines the number M of signal levels and supplies the number M to the dimming coder and a channel quality measurement unit which measures a quality of communication channel and output the quality of communication channel, wherein the symbol-codeword table used by the dimming coder is determined according to the number M of signal levels supplied from the modulation level determination unit and the dimming level, wherein the modulation level determination unit determines the number M of signal levels according to one or both of the quality of communication channel output from the channel quality measurement unit and the dimming level, wherein the quality of communication channel is determined by $A/\sigma$ or a function $f(A/\sigma)$ of $A/\sigma$ as a parameter, and wherein 'A' is a half of a maximum symbol intensity, and '$\sigma$' is a standard deviation of Gaussian noise.

Advantageous Effects

Figure 4:
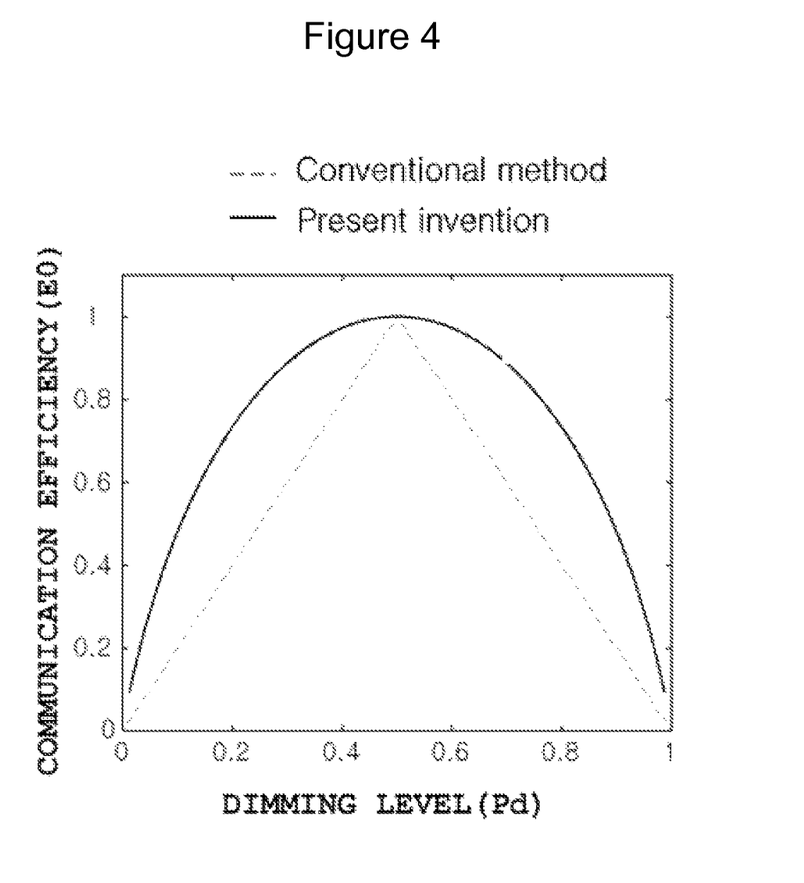
FIG. 4 is a graph illustrating comparison of a communication efficiency of the wireless light communication system using the illumination light source according to the present invention and a communication efficiency of a time multiplexing method of the related art.

For implantation of communication while maintaining a brightness adjusting function, a communication efficiency of a time multiplexing method in the related art is illustrated in a graph of FIG. 1, and a communication efficiency of the wireless light communication system according to the present invention is illustrated in a graph of FIG. 4. FIG. 4 is a graph illustrating comparison of the communication efficiency of the wireless light communication system using the illumination light source according to the present invention and the communication efficiency of the time multiplexing method of the related art. It can be seen that the communication efficiency of the wireless light communication system using the illumination light source according to the present invention is better than the communication efficiency of the related art.

In comparison of the communication efficiency $E_0$ of the time multiplexing method of the related art and the communication efficiency $E_p$ of the wireless light communication system according to the present invention, it can be understood that the $E_p$ is always better.

If the dimming level $P_d$ is set to x and the ratio of two efficiencies $E_p/E_0$ is set to f(x), Equation 3 can be obtained through simple calculation.

$$f(x) = \frac{-x\log_2 x - (1-x)\log_2(1-x)}{2x}, \quad \text{[Equation 3]}$$

$0 < x < 0.5 =$ $$-\frac{1}{2}\log_2 x - \frac{1}{2x}\log_2(1-x) + \frac{1}{2}\log_2(1-x)$$

$f'(x) < 0$

-continued $$f'' > 0$$

$$\lim_{x \to 0^+} f(x) = +\infty$$

$$f'(0.5^-) = -2$$

Figure 5:
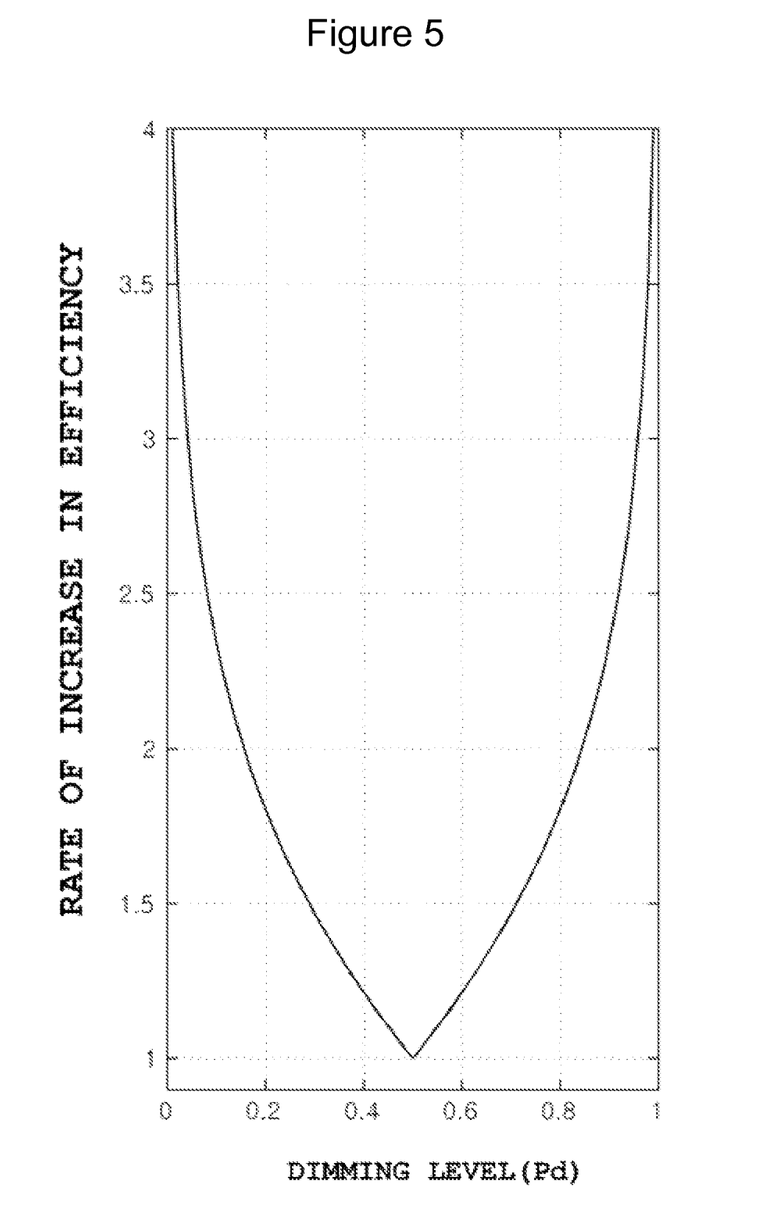
FIG. 5 is a graph illustrating a ratio of communication efficiencies as comparison of the communication efficiency of the wireless light communication system using the illumination light source according to the present invention and the communication efficiency of the time multiplexing method of the related art

FIG. 5 is a graph illustrating a ratio of communication efficiencies as comparison of the communication efficiency of the wireless light communication system using the illumination light source according to the present invention and the communication efficiency of the time multiplexing method of the related art. It can be seen that, as the dimming level is deviated from 50%, the communication efficiency of the wireless light communication system using the illumination light source according to the present invention is rapidly increased. Referring to FIG. 5, it can be understood that, when the dimming level is about 29% or 71%, the f(x) is 1.5, and thus, the communication efficiency of the wireless light communication system according to the present invention is improved by 50% in comparison with the communication efficiency of the time multiplexing method of the related art. In addition, it can be understood that, when the dimming level is about 16% or 84%, the communication efficiency of the wireless light communication system according to the present invention is improved by 100%.

BRIEF DESCRIPTION OF DRAWINGS

(a), (b), (c), and (d) of FIG. 10 are graphs illustrating a change of a probability mass function according to dimming methods in the case of 4-PAM, which correspond to dimming level of 50%, dimming level of 75% in inverse source coding (ISC), dimming level of 75% in analog dimming, and dimming level of 75% in hybrid dimming.

BEST MODE

Hereinafter, a structure and an operating method of a transmission apparatus of a wireless light communication system using an illumination light source according to exemplary embodiment of the present invention will be described in detail with reference to the attached drawings.

Various kinds of light such as visible light, infrared light, or ultraviolet light can be used for the wireless light communication. Although a brightness adjusting (dimming) function is mainly used for visible light communication, dimming coding methods and apparatuses for the brightness adjusting function according to embodiments of the present invention are not limited to the visible light communication. In addition, although the scope of the present invention includes the entire wireless light communication where an intensity of light is changed according to a transmission symbol, for the convenience of description, communication using an NRZ-OOK (Non-Return-to-Zero On-Off Keying) method or communication using an M-PAM method will be mainly described. In binary transmission of the NRZ-OOK method, '1' is transmitted through ON pulses, and '0' is transmitted through OFF pulses. In the M-PAM method, data are modulated into M signal levels to be transmitted.

The wireless light communication system using an illumination light source according to the present invention is configured to include a transmission apparatus and a reception apparatus. The transmission apparatus is input with data and a dimming level of the illumination light source, codes the input data, diming-codes the coded data so as to correspond to the input dimming level, line-codes the data into a digital pulse signal, and outputs the digital pulse signal to the illumination light source. The illumination light source emits light according to the pulse signal.

The reception apparatus senses the light of the illumination light source, receives information on the data and information on the dimming level from the sensed light signal, line-decodes the pulse single of the input data into a digital signal, dimming-decodes the line-decoded data by using the information on the input dimming level, decodes the data, and outputs the decoded data.

Hereinafter, various embodiments of the transmission apparatus of the wireless light communication system using the illumination light source having the above-described configuration according to the present invention will be described. Since the reception apparatus of the wireless light communication system is configured and operated as an inverse process of the transmission apparatus, detailed description of the structure and the operating method of the reception apparatus will be omitted.

First Embodiment

Figure 2:
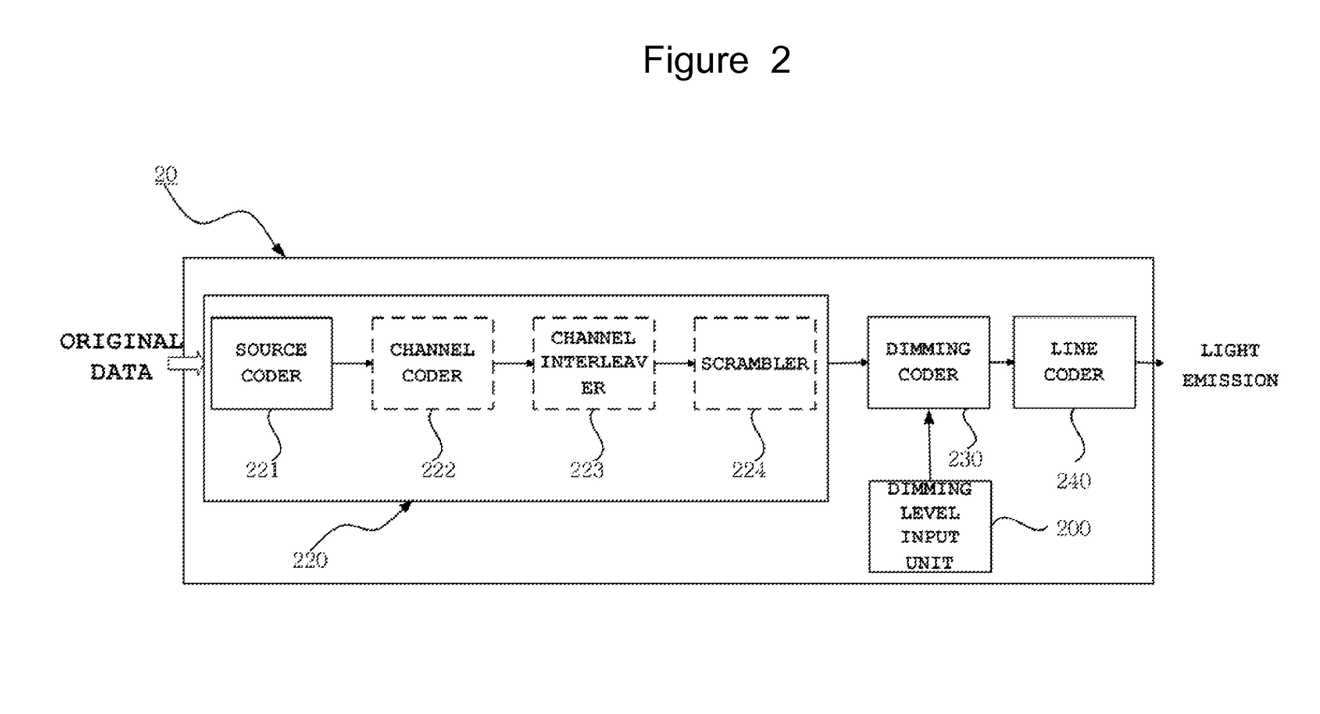
FIG. 2 is a block diagram illustrating a configuration of a transmission apparatus of a wireless light communication system using an illumination light source according to a first embodiment of the present invention.

A wireless light communication system using an illumination light source according to a first embodiment of the present invention has a feature in that inverse source coding (ISC) is performed by using an NRZ-OOK method. FIG. 2 is a block diagram illustrating a configuration of a transmission apparatus of the wireless light communication system using the illumination light source according to the first embodiment of the present invention. Referring to FIG. 2, the transmission apparatus 20 of the wireless light communication system using the illumination light source according to the present invention is configured to include a dimming level input unit 200, a coder 220, a dimming coder 230, and a line coder 240.

The dimming level input unit 200 receives a dimming level of the illumination light source as an input and transmits the dimming level to the dimming coder 230.

The coder 220 codes original data so that '1' and '0' occupy 50%, respectively and the coder 220 outputs the coded data to the dimming coder 230. The coder 220 is configured to include a source coder 221. If necessary, the coder 220 may further include one or more of a channel coder 222, a channel interleaver 223, and a scrambler 224.

The dimming coder 230 checks the dimming level input to the dimming level input unit 200, generates the symbol-codeword table corresponding to the dimming level, codes the data coded by the coder 220 by using the generated symbol-codeword table, and outputs the coded data to the line coder 240. The dimming coder 230 is a device which performs an inverse process of the compression process as a source coding process for minimizing the number of data bits. Therefore, the dimming coder 230 may be called an 'inverse source coder', and the dimming coding may be called inverse source coding.

The line coder 240 converts the data coded by the dimming coder 230 into pulse signals and outputs the pulse signals to the illumination light source.

The transmission apparatus of the wireless light communication system using the illumination light source having the above-described configuration according to the first embodiment of the present invention has a feature in that the communication efficiency can be maximized while the brightness adjusting function is maintained. Hereinafter, structures and operating methods of the above-described components will be described more in detail. Referring to FIG. 2, during the communication, the original data are input to the coder 220 configured with the source coder 221. The original data in an analog or digital form which are input to the source coder are coded and compressed into digital data.

On the other hand, if necessary, the coder 220 may further include the channel coder 222, the channel interleaver 223, and the scrambler 224. The coded data are input to the channel coder 222, and the channel coder 222 codes the data into data which are invulnerable to errors so that a reception side can check and correct the error during the transmission of data through the channel. Generally, in this case, the coded data has a digital form where '1' exists by 50% and '0' exists by 50%. The channel interleaver 223 has a function of re-arranging the order of data sequence to distribute concentrated errors (burst errors). The scrambler 224 is configured to cope with a specific case where the ratio of '0' and '1' is deviated from 50% after the data pattern is channel-coded at random.

The data coded by the coder are input into the dimming coder 230. The dimming coder 230 checks the dimming level $P_d$ input to the dimming level input unit 200 and generates a symbol-codeword table corresponding to the dimming level through a dimming coding method. The dimming coder 230 codes the data which are coded so that '1' and '0' occupy 50%, respectively, into data where '1' occupies by the dimming level $P_d$ and '0' occupies by $(1-P_d)$ again by using the generated symbol-codeword table and outputs the coded data. The dimming coding method will be described later in detail.

The data coded by the dimming coder 230 are input to the line coder 240. The line coder 240 converts the coded digital data into appropriate pulse waveform signals and transmits the pulse waveform signals to the illumination light source. The illumination light source emits light according to the pulse output from line coder.

Another embodiment of the dimming coder according to the first embodiment of the present invention is as follows. The dimming coder 230 checks the dimming level input to the dimming level input unit 200 and performs dimming coding so that the data coded by the coder 220 correspond to the dimming level.

On the other hand, a header containing information on the dimming level or information on the symbol-codeword table may be generated, and the coded header and the dimming-coded data may be transmitted to the reception apparatus of the wireless light communication system. In addition, the received data may be decoded.

Hereinafter, the data dimming coding process of the dimming coder 230 will be described in detail.

The transmission apparatus of the wireless light communication system according to the present invention is configured based on an information theory for maximizing the data efficiency during the communication while maintaining the brightness adjusting function. On the basis of the information theory, in NRZ-OOK (Non-Return-to-Zero On-Off Keying) where the dimming level $P_d$ is given, in the case where '1' is transmitted by a ratio of $P_d$ and '0' is transmitted by a ratio of $(1-P_d)$, maximum efficiency or data rate is theoretically given as entropy. The value becomes the maximum communication efficiency, which is denoted by $E_p$.

$$E_p = -P_d \log_2 P_d - (1-P_d) \log_2 (1-P_d) \qquad \text{[Equation 4]}$$

In other words, in order to obtain the maximum efficiency of Equation 4, the data need to be converted into a form where '1' exists by $P_d$ and '0' exists by $(1-P_d)$. During this process, the number of data bits is increased. Since this is an inverse source coding process for minimizing the number of data bits, the process may be called inverse source coding, and in the present invention, this process is referred as dimming coding. The dimming coder 230 is a device for coding the data through this process. Due to the dimming coder 230, the ratio of '0' and '1' is adjusted according to the dimming level, and at the same time, the maximum efficiency of data communication is secured.

The dimming coder 230 is a device for converting the source-coded and channel-coded data where '0' exists by 50% and '1' exists by 50% into data where '1' exists by the dimming level $P_d$ and '0' exists by $(1-P_d)$. Similarly to the presence of various kinds of the data compression methods, there are various dimming coding methods. In other words, if a compression (source coding) method can be performed inversely, it becomes a dimming coding (inverse source coding) method.

In the preferred embodiment of the present invention, inverse Huffman coding using the Huffman coding in an inverse manner is disclosed as an example. Like the compression (source coding) using Huffman coding, dimming coding (inverse source-coding) using inverse Huffman coding is performed.

An example where the dimming level input to the dimming level input unit is 70% will be described. If the dimming level is 70%, '1' occurs by 70%, and '0' occurs by 30%. First, before the dimming coding method is considered, the source-coding as an inverse process is considered. Since the occurrence frequency of '1' is too high, the next bit is considered.

Namely, '1' is divided into '10' and '11'. Table 1 lists probabilities of data by taking into consideration Huffman coding.

TABLE 1

| Symbol | Probability | Codeword |
|--------|-------------|----------|
| 0      | 0.3         | 00       |
| 10     | 0.21        | 01       |
| 11     | 0.49        | 1        |

In Table 1, if the Huffman coding is performed, the codeword in the last column can be obtained. The average lengths of the symbol or codeword before and after the coding are 1.7 and 1.51, respectively, and thus, the compression ratio is about 0.888 through the calculation of 1.51/1.7. In Table 1, the symbol '0' has a length of 1, and each of the symbols '10' and '11' has a length of 2. The average length is obtained as a product of the symbol length and the probability. Referring to Equation 4, the entropy of the dimming level of 70% is 0.881, and the maximum compression limit is 0.119. In case of the compression using the Huffman coding, since the value can be reduced by 0.112, 94% ($<(1-0.888)/(1-0.881)$) or more can be obtained in comparison with the maximum compression.

Now, the data where '0' and '1' exist by 50%, respectively, are converted into the data where '1' exists by 70% by using the inverse Huffman coding. Table 2 is obtained from the inverse of the mapping of Table 1. Table 2 shows the symbol-codeword table corresponding to the dimming level of 70%.

TABLE 2

| Symbol | Probability | Codeword |
|--------|-------------|----------|
| 00     | 0.25        | 0        |
| 01     | 0.25        | 10       |
| 1      | 0.5         | 11       |

The average lengths before and after the inverse Huffman coding are 1.5 and 1.75, respectively. A decompression rate is calculated as 1.75/1.5 which is about 1.17. As a final result, it can be seen that the dimming level is calculated by using Equation 5 and is approximate to its target value of 70%.

$$\frac{0 \times \frac{1}{4} + \left(1 \times \frac{1}{4} + 0 \times \frac{1}{4}\right) + \left(1 \times \frac{1}{2} + 1 \times \frac{1}{2}\right)}{1 \times \frac{1}{4} + 2 \times \frac{1}{4} + 2 \times \frac{1}{2}} = \frac{1.25}{1.75} \approx 0.714 \quad \text{[Equation 5]}$$

Although the calculated value is different from the dimming level of 70%, if the Huffman coding is performed more elaborately through multi-bits, the inverse Huffman coding is also elaborated, the value is more approximate to the dimming level of 70%. Therefore, the transmission apparatus of the wireless light communication system using the illumination light source according to the present invention can maximize communication efficiency while maintaining the dimming level.

Second Embodiment

Figure 3:
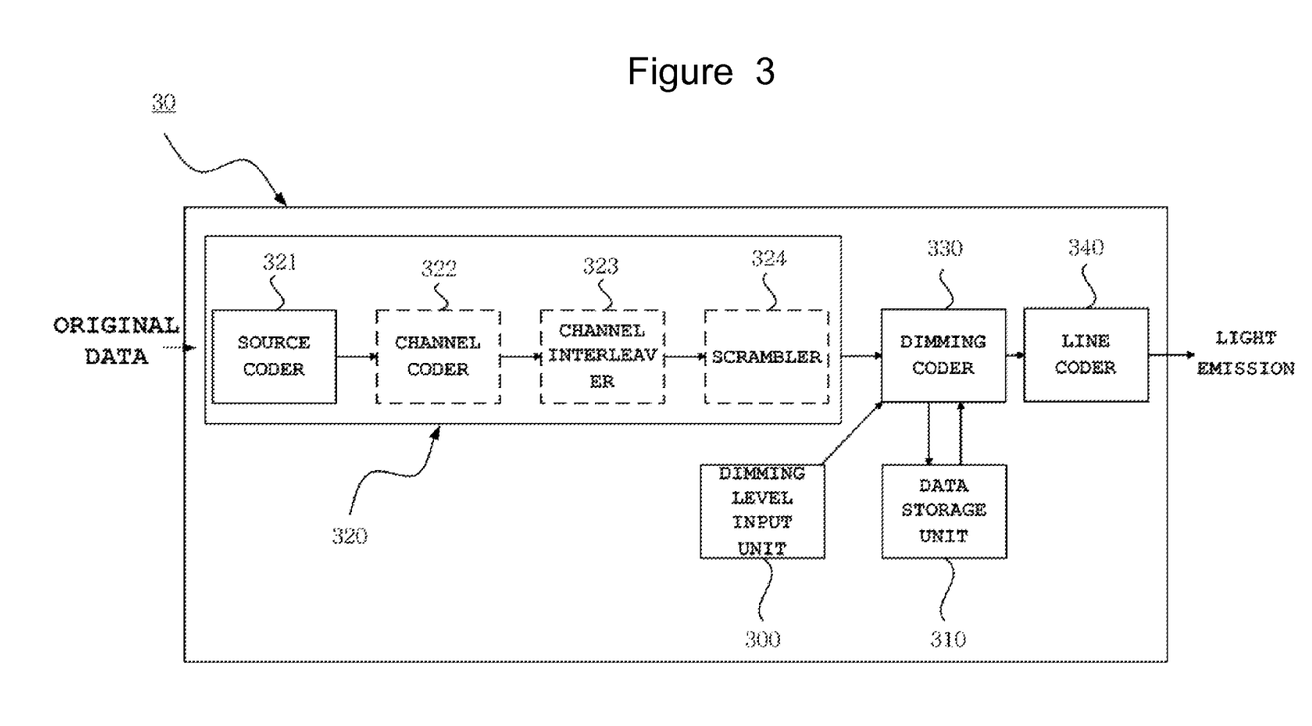
FIG. 3 is a block diagram illustrating a configuration of a transmission apparatus of a wireless light communication system using an illumination light source according to a second embodiment of the present invention.

A transmission apparatus 30 of a wireless light communication system using an illumination light source according to a second embodiment of the present invention has a feature in that a data storage unit 310 which stores a symbol-codeword table is further included in the transmission apparatus 20 according to the first embodiment of the present invention. Referring to FIG. 3, the transmission apparatus 30 of the wireless light communication system using the illumination light source according to the present invention is configured to include a dimming level input unit 300, a coder 320, a dimming coder 330, a line coder 340, and a data storage unit 310. In the second embodiment, the components except for the data storage unit 310 are the same as those of the first embodiment, and redundant description thereof will be omitted.

The data storage unit 310 according to the second embodiment stores symbol-codeword tables corresponding to a plurality of the dimming levels, which are generated by the dimming coder 330 in advance. The dimming coder 330 checks a dimming level input to the dimming level input unit 300 and reads a symbol-codeword table corresponding to the dimming level from the data storage unit 310. Next, the data coded by the coder 320 are coded by using the read symbol-codeword table so as to correspond to the dimming level.

In this case, the reception apparatus of the wireless light communication system needs to be configured to include a data storage unit so as to decode the received data. The transmission apparatus 30 of the wireless light communication system according to the second embodiment of the present invention does not transmit the information of the symbol-codeword table corresponding to the dimming level to the reception apparatus, but it transmits only the communication signal of the coded data. Accordingly, when the dimming level is changed, the reception apparatus checks an average dimming level of the communication signals of the received data and reads the symbol-codeword table approximate to the value of the average dimming level from the data storage unit. Therefore, without the transmission of the symbol-codeword table corresponding to the dimming level, the reception apparatus can decode the received data.

Another example of the dimming coder according to the second embodiment of the present invention is as follows. The dimming coder 330 checks the dimming level input to the dimming level input unit 300 and reads the symbol-codeword table corresponding to the dimming level from the data storage unit 310. The dimming coder diming-codes the data coded by the coder 320 so as to correspond to the dimming level by using the read symbol-codeword table. On the other hand, the dimming coder a header containing information on the symbol-codeword table corresponding to the dimming level or information on the dimming level and transmits the coded header and the diming-coded data to the reception apparatus of the wireless light communication system, so that the received data can be decoded.

Third Embodiment

Figure 6:
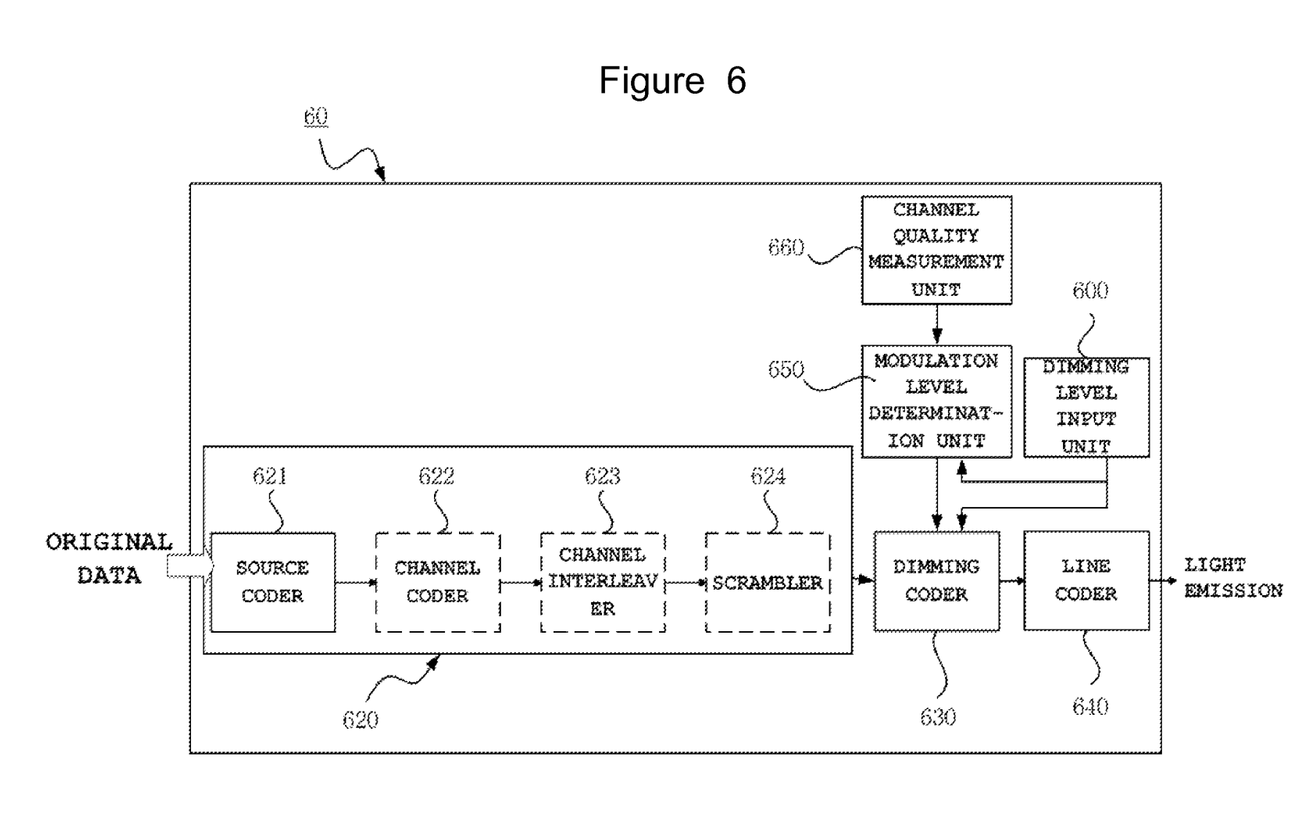
FIG. 6 is a block diagram illustrating a configuration of a transmission apparatus of a wireless light communication system using an illumination light source according to a third embodiment of the present invention.

Hereinafter, a transmission apparatus of a wireless light communication system using an illumination light source according to a third embodiment of the present invention will be described with reference to FIG. 6. FIG. 6 is a block diagram illustrating a configuration of the transmission apparatus of the wireless light communication system using the illumination light source according to the third embodiment of the present invention. The transmission apparatus 60 according to the third embodiment of the present invention is configured to include a dimming level input unit 600, a coder 620, a dimming coder 630, a line coder 640, a modulation level determination unit 650, and a channel quality determination unit 660. Unlike the first and second embodiments, in the transmission apparatus 60 according to the third embodiment, the dimming coder 630 performs M-ary pulse amplitude modulation (hereinafter, referred to as an 'M-PAM') using M signal levels on the data. Hereinafter, components of the transmission apparatus according to the third embodiment will be described.

The configurations and operations of the dimming level input unit, the coder, and the line coder of the transmission apparatus 60 according to the third embodiment are the same as those of the first and second embodiments, and thus, redundant description thereof will be omitted.

Figure 11:
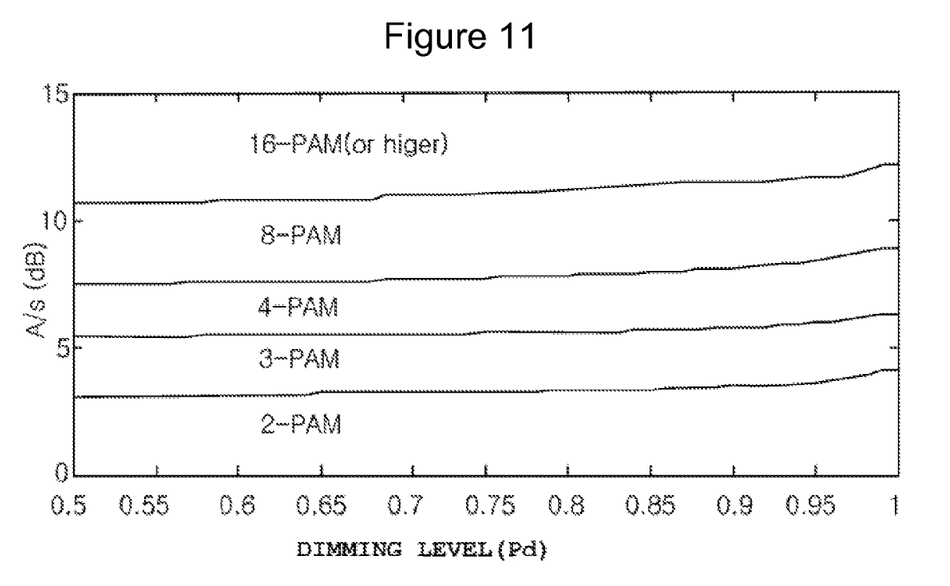
FIG. 11 is a diagram illustrating an example of determination of modulation level according to a dimming level and a quality of communication channel, where the number of to-be-processed modulation levels is limited to 2, 3, 4, 8, and 16.

The channel quality determination unit 660 measures a quality of communication channel and outputs the quality of communication channel to the modulation level determination unit 650. The modulation level determination unit 650 determines the number of signal levels according to one or both of the quality of communication channel supplied from the channel quality determination unit 660 and the dimming level supplied from the dimming level input unit 600 and outputs the number of signal levels to the dimming coder 630. In general, if the quality of communication channel is not good so that the quality of received signals is not good, a relatively small value of M tends to be useful; and if the quality of communication channel is good, a relatively large value of M tends to be useful. FIG. 11 is a diagram illustrating an example of determination of modulation level according to a dimming level and a quality of communication channel, where the number of to-be-processed modulation levels is limited to 2, 3, 4, 8, and 16. In the method illustrated in FIG. 11, if the quality of communication channel in the vertical axis and the dimming level in the horizontal axis are determined, the value of M of the M-PAM in the corresponding region is to be used. In the example illustrated in FIG. 11, as the quality of communication channel in the vertical axis becomes good, the value of M tends to be increased. With respect to a change in optimum value of M according to the change of the dimming level in the horizontal axis, there may be a slight small difference but not a very sensitive change. As a reference, although only the dimming levels in a range from 0.5 to 1.0 are illustrated in FIG. 11, the graph with respect to the dimming levels below the range is implemented to be symmetric with respect to 0.5. Namely, the result with respect to the dimming level (0.5−x) is the same as the result with respect to the dimming level (0.5+x).

The channel quality determination unit 660 determines the quality of communication channel by using A/σ or a function f(A/σ) of A/σ as a parameter. Herein, 'A' is a half of the maximum symbol intensity, and 'σ' is a standard deviation of Gaussian noise.

The dimming coder 630 determines the symbol-codeword table according to the number M of signal levels output from the modulation level determination unit 650 and the above-described dimming level, diming-codes the data output from the coders by using the determined symbol-codeword table, and outputs the dimming-coded date to the line coder. The dimming coder 630 may generate the symbol-codeword table similarly to the first embodiment, or the dimming coder 630 may read and use the symbol-codeword table which is stored in the data storage unit in advance similarly to the second embodiment.

Similarly to the third embodiment, in the case where data are pulse-amplitude-modulated into M signal levels and are diming-coded, although the data can be transmitted at high speed, the minimum inter-symbol distance is reduced, the operation is sensitive to noise or interference. Therefore, the transmission apparatus according to the third embodiment measures the quality of communication channel and determines the number M of signal levels which is optimized in communication capacity according to the equality of communication channel. Namely, if the quality of communication channel is good, the number M is set to be large; and if the quality of communication channel is not good, the number M is set to be small. Therefore, the transmission apparatus can be efficiently driven according to the channel environment.

Figure 7:
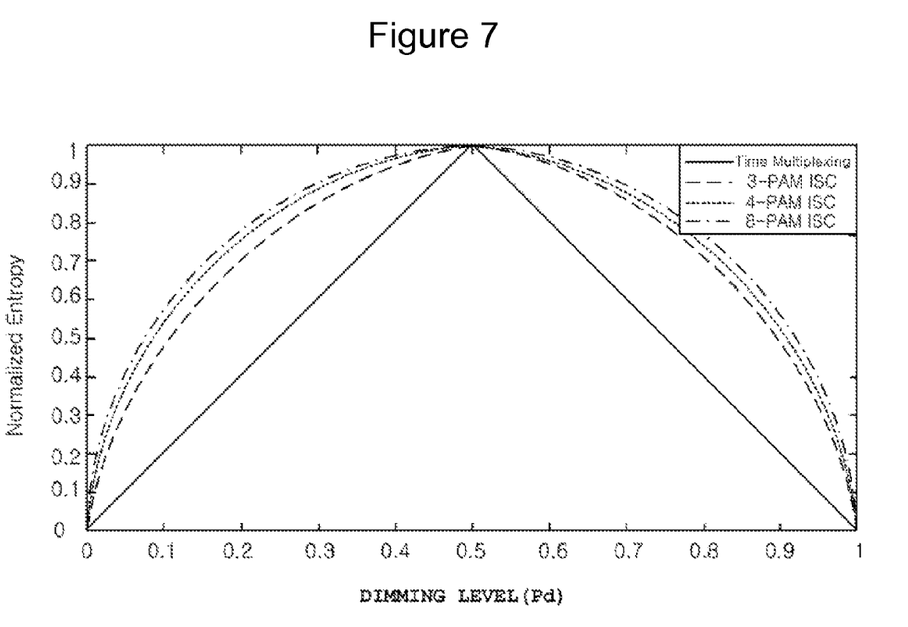
FIG. 7 is a graph illustrating normalized entropy in the cases of 3-PAM, 4-PAM, and 8-PAM dimming coding in the transmission apparatus according to the third embodiment of the present invention and normalized entropy in the time multiplexing method of the related art.

FIG. 7 is a graph illustrating normalized entropy in the cases of 3-PAM, 4-PAM, and 8-PAM dimming coding in the transmission apparatus according to the third embodiment of the present invention and normalized entropy in the time multiplexing method of the related art. Referring to FIG. 7, although there is a slight difference, it can be understood that, in the cases of dimming coding of the M-PAM method, patterns of a change in entropy according to the dimming level are similar.

Fourth Embodiment

Figure 8:
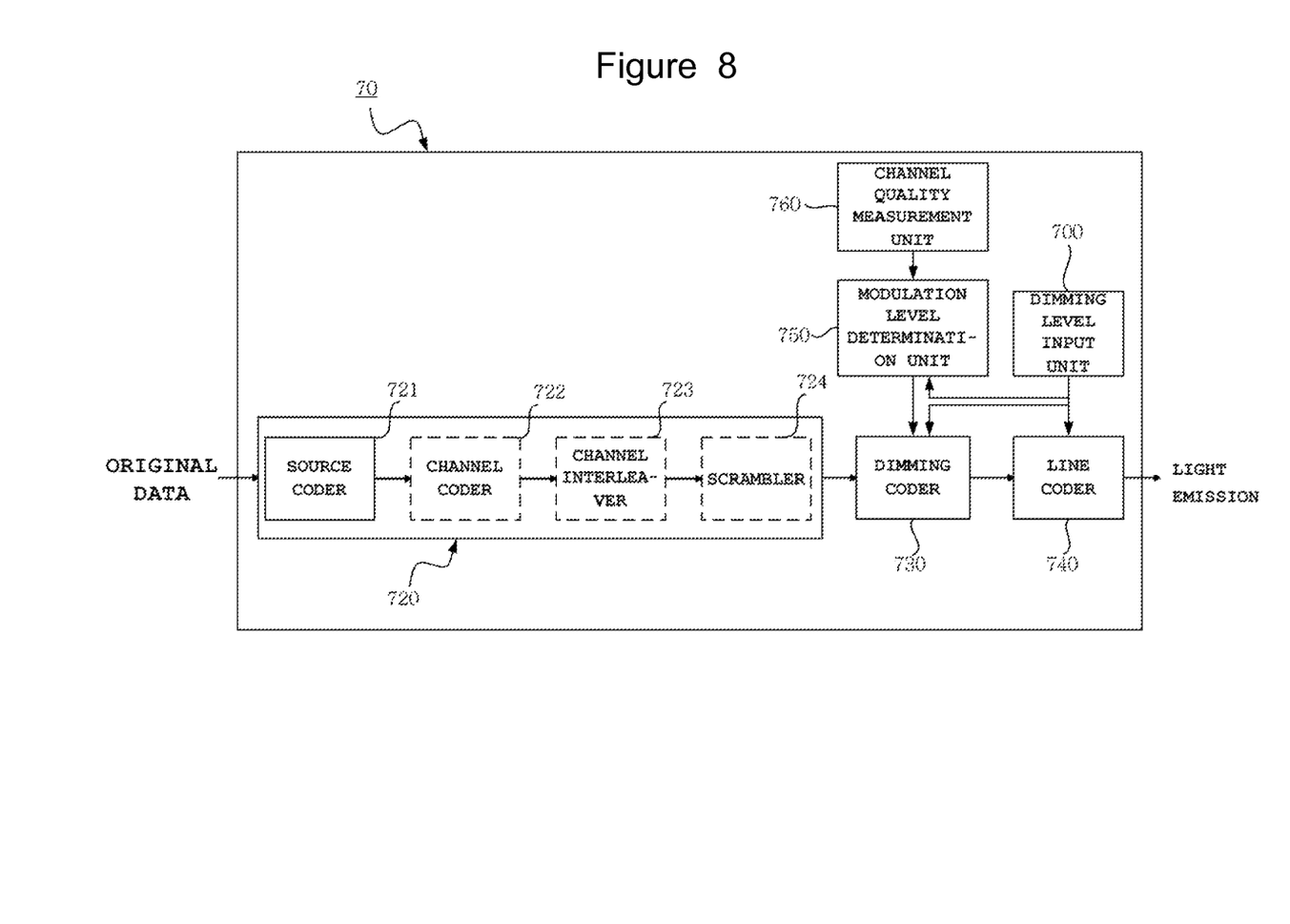
FIG. 8 is a block diagram illustrating a configuration of a transmission apparatus of a wireless light communication system using an illumination light source according to a fourth embodiment of the present invention.
Figure 9:
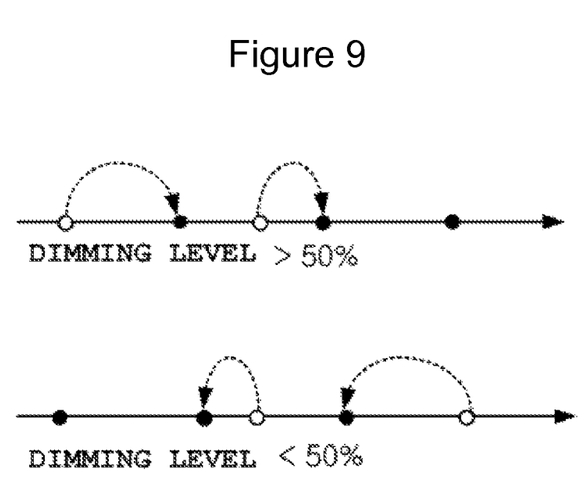
FIG. 9 is a signal constellation diagram illustrating how symbols are moved on the signal constellation diagram during analog dimming.

Hereinafter, a transmission apparatus of a wireless light communication system using an illumination light source according to a fourth embodiment of the present invention will be described with reference to FIG. 8. FIG. 8 is a block diagram illustrating a configuration of the transmission apparatus of the wireless light communication system using the illumination light source according to a fourth embodiment of the present invention. the transmission apparatus 70 according to the fourth embodiment of the present invention is configured to include a dimming level input unit 700, a coder 720, a dimming coder 730, and a line coder 740. The transmission apparatus 70 according to the fourth embodiment uses hybrid dimming. Unlike the first, second, and third embodiments, the transmission apparatus 70 adjusts the dimming level of the illumination light source by using both of the inverse source coding (ISC) and the analog dimming. In this specification, the analog dimming is defined as dimming level adjusting so that, if the dimming level is larger than 50%, the intensities of remaining symbols except for the symbol having the maximum intensity in a signal constellation are allowed to be increased, and if the dimming level is smaller than 50%, the intensities of remaining symbols except for the symbol having the minimum intensity are allowed to be increased. FIG. 9 is a signal constellation diagram illustrating how symbols are moved on the signal constellation diagram during analog dimming. The hybrid dimming is defined as dimming level adjusting so that symbols are moved by an amount smaller than the amount of the symbols which need to be moved in order to satisfy the dimming level through only the analog dimming and, after that, the remaining symbols are moved through the inverse source coding (ISC) so as to adjust the final dimming level. On the contrary, a degree of the inverse source coding may first be determined, and the remaining adjusting may be performed through the analog dimming.

In the transmission apparatus 70 according to the fourth embodiment, the information of dimming level is supplied to both of the dimming coder and the line coder. The dimming coder inverse-source-codes data by using the symbol-codeword table corresponding to a certain amount of the dimming level and outputs the data. The line coder converts the inverse-source-coded data output from the dimming coder into pulse signals and performs analog dimming so as to satisfy the dimming level to output the resulting data.

Figure 10:
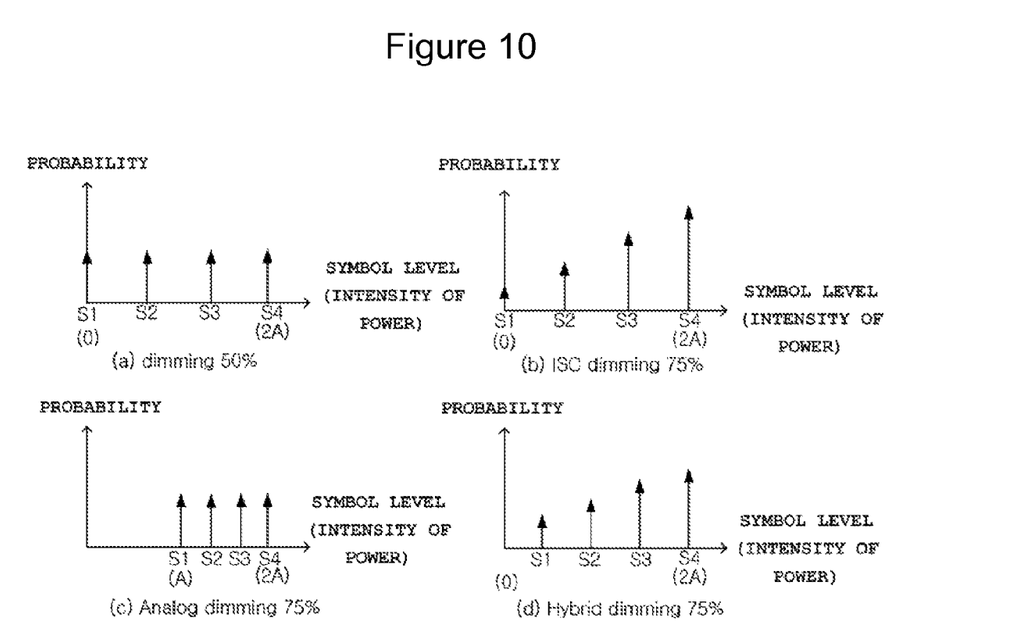

(a), (b), (c), and (d) of FIG. 10 are graphs illustrating a change of a probability mass function according to dimming methods in the case of 4-PAM, which correspond to dimming level of 50%, dimming level of 75% in inverse source coding (ISC), dimming level of 75% in analog dimming, and dimming level of 75% in hybrid dimming.

The transmission apparatus according to the fourth embodiment may use ISC in the NRZ-OOK similarly to the first and second embodiments, or the transmission apparatus may use ISC in the M-PAM method by using a configuration where the transmission apparatus further includes a modulation level determination unit and a channel quality measurement unit similarly to the third embodiment. Therefore, the transmission apparatus according to the fourth embodiment can implement hybrid dimming using the ISC in the NRZ-OOK method and the analog dimming or hybrid dimming using the ISC in the M-PAM method and the analog dimming.

Hereinafter, an operating method of a reception apparatus corresponding to operations of the above-described transmission apparatuses of the wireless light communication systems using the illumination light source according to the first to fourth embodiments of the present invention will be described in brief.

The reception apparatus of the wireless light communication system includes a data storage unit including symbol-codeword tables corresponding to a plurality of dimming levels or a dimming decoder which has an algorithm of detecting a dimming level from the coded data transmitted from the transmission apparatus and generating a symbol-codeword table corresponding to the detected dimming level. Since the remaining operation methods except for the dimming decoding method of the reception apparatus are an inverse process of the transmission apparatus, the description thereof is omitted.

On the other hand, in an embodiment of the reception apparatus of the wireless light communication system having the above-described configuration, data received from a transmission apparatus are decoded, and a dimming level is detected by using an intensity ratio of the decoded data. Next, a symbol-codeword table corresponding to the detected dimming level is generated, or a symbol-codeword table which is stored in the data storage unit in advance is read. Next, dimming-decoding is performed by using the symbol-codeword table which is generated or read according to the dimming level.

In another embodiment of the reception apparatus, a header transmitted from a transmission apparatus is decoded, and information on a dimming level is detected from the header. Next, a symbol-codeword table corresponding to the detected dimming level is generated, or a symbol-codeword table which is stored in the data storage unit in advance is read. Next, dimming-decoding is performed by using the symbol-codeword table which is generated or read according to the information on the dimming level.

In still another embodiment of the reception apparatus, a header transmitted from a transmission apparatus is decoded, and information of a symbol-codeword table is detected from the header. Next, dimming-decoding is performed by using the detected symbol-codeword table.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

A wireless light communication system using an illumination light source according to the present invention can be widely used in the field where wireless light communication can be performed by using an installed illumination lamp, a car lamp, or the like. Although a brightness adjusting function is mainly used for visible light illumination, dimming coding of the wireless light communication system according to the present invention can be used in the field using ultraviolet light or infrared light as well as the field using visible light.

The invention claimed is:

1. A transmission apparatus of a wireless light communication system using an illumination light source comprising:
    a dimming level input unit which receives a dimming level of the illumination light source as an input;
    a coder which codes original data so that '1' and '0' occupy by 50%, respectively, and outputs the coded data;
    a dimming coder which checks the dimming level input to the dimming level input unit and dimming-codes the data output from the coder by using a symbol-codeword table corresponding to the dimming level; and
    a line coder which converts the data dimming-coded by the dimming coder into pulse signals for driving the illumination light source and outputs the pulse signals to the illumination light source,
    wherein the illumination light source emits light according to the pulse signal output from the line coder.

2. The transmission apparatus of the wireless light communication system using the illumination light source according to claim 1,
    wherein the dimming coder primarily dimming-codes data so as to satisfy the dimming level and outputs the data, and
    wherein the line coder converts the data dimming-coded by the dimming coder into pulse signals, performs analog dimming on the converted pulse signals so as to satisfy the dimming level, and outputs the data to the illumination light source.

3. The transmission apparatus of the wireless light communication system using the illumination light source according to claim 1, wherein the dimming coder generates the symbol-codeword table corresponding to the dimming level input from the dimming level input unit and dimming-codes data output from the coder by using the generated symbol-codeword table.

4. The transmission apparatus of the wireless light communication system using the illumination light source according to claim 1, further comprising a data storage unit which stores symbol-codeword tables corresponding to a plurality of dimming levels, respectively
    wherein the dimming coder reads a symbol-codeword table corresponding to the dimming level input from the dimming level input unit from the data storage unit and dimming-codes data output from the coder by using the read symbol-codeword table.

5. The transmission apparatus of the wireless light communication system using the illumination light source according to claim 1, wherein the dimming coder uses a symbol-codeword table for performing an inverse source-coding process to code data.

6. The transmission apparatus of the wireless light communication system using the illumination light source according to claim 1, wherein the symbol-codeword table of the dimming coder is configured by using inverse Huffman coding using Huffman coding in an inverse manner.

7. The transmission apparatus of the wireless light communication system using the illumination light source according to claim 1, wherein the coder includes a source coder which receives digital data as an input or receives analog data as an input and converts the analog data into digital data to compress and code the digital data.

8. The transmission apparatus of the wireless light communication system using the illumination light source according to claim 7, wherein the coder includes one or more of:
- a channel coder which codes the data output from the source coder so that errors occurring during transmission of data through a channel can be detected or corrected;
- a channel interleaver which re-arranges a data sequence in order to prevent burst errors on the channel; and
- a scrambler which randomizes a data pattern when a ratio of '0' and '1' is deviated from 50% after channel coding of the channel coder.

9. The transmission apparatus of the wireless light communication system using the illumination light source according to claim 1, wherein the illumination light source is configured with an LED.

10. The transmission apparatus of the wireless light communication system using the illumination light source according to claim 1, wherein the dimming coder generates a header containing information on the dimming level or information on the symbol-codeword table and transmits the generated header together with the dimming-coded data.

11. The transmission apparatus of the wireless light communication system using the illumination light source according to claim 10, wherein a data ratio of ON and OFF in the header is determined according to the dimming level indicated by the header.

12. The transmission apparatus of the wireless light communication system using the illumination light source according to claim 1, further comprising a modulation level determination unit which determines a number M of signal levels and supplies the number M to the dimming coder,
- wherein the symbol-codeword table used by the dimming coder is determined according to the number M of signal levels supplied from the modulation level determination unit and the dimming level.

13. The transmission apparatus of the wireless light communication system using the illumination light source according to claim 12, further comprising a channel quality measurement unit which measures a quality of communication channel and outputs the quality of the communication channel,
- wherein the modulation level determination unit determines the number M of signal levels according to one or both of the quality of the communication channel output from the channel quality measurement unit and the dimming level.

14. The transmission apparatus of the wireless light communication system using the illumination light source according to claim 13, wherein the quality of the communication channel is determined by A/σ or a function f(A/σ) of A/σ as a parameter and wherein 'A' is a half of a maximum symbol intensity, and 'σ' is a standard deviation of Gaussian noise.

* * * * *